United States Patent [19]

Hattori

[11] Patent Number: 4,526,561
[45] Date of Patent: Jul. 2, 1985

[54] V-BELT TRANSMISSION APPARATUS
[75] Inventor: Torao Hattori, Wako, Japan
[73] Assignee: Honda Giken Kogyo Kabushiki Kaisha, Tokyo, Japan
[21] Appl. No.: 589,286
[22] Filed: Mar. 14, 1984
[30] Foreign Application Priority Data Mar. 14, 1983 [JP] Japan ................................. 58-40784
May 23, 1983 [JP] Japan ................................. 58-89083

[51] Int. Cl.³ ........................... F16G 5/00; F16G 1/22
[52] U.S. Cl. .................................... 474/242; 474/201
[58] Field of Search ...................... 474/201, 242–246, 474/261, 262, 264, 265

[56] References Cited

U.S. PATENT DOCUMENTS 4,303,404 12/1981 Moore ................................. 474/242
4,365,965 12/1982 Russ, Jr. ............................. 474/201
4,371,361 2/1983 Giacosa ............................. 474/201
4,428,740 1/1984 Moore ................................. 474/242

FOREIGN PATENT DOCUMENTS 1228884 11/1966 Fed. Rep. of Germany .
8-7762 9/1933 Japan .
8103183 7/1981 Netherlands ....................... 474/242

Primary Examiner—Stephen J. Novosad
Assistant Examiner—Bruce M. Kisliuk
Attorney, Agent, or Firm—Armstrong, Nikaido, Marmelstein & Kubovcik

[57] ABSTRACT

A V-belt assembly for use in a V-belt transmission is provided. The V-belt assembly comprises an endless belt having a plurality of endless layers wherein the thickness of each of the layers is less than the thickness of the adjacent outer layer. The V-belt assembly also includes a plurality of V-shaped members, each V-shaped member having a belt engaging surface and a plurality of intermediate members disposed between adjacent V-shaped members.

6 Claims, 5 Drawing Figures

4,526,561

V-BELT TRANSMISSION APPARATUS

BACKGROUND OF THE INVENTION

This invention relates to a V-belt transmission apparatus using a metallic belt and more particularly, to the V-belt itself.

The inventor herein has disclosed in his copending U.S. application Ser. No. 589,285, filed Mar. 14, 1984, a V-belt transmission having an endless belt, a plurality of V-shaped members and intermediate members disposed between adjacent V-shaped members. During operation, the metallic belt member is bent as it passes around V-pulleys in the transmission. This bending action is repeated each time the belt passes around a pulley.

In some of the embodiments disclosed in the copending application, the belt is formed from a plurality of layers. With belts of this type, it is desirable to uniformly apply the bending stresses acting on the respective layers which form the metallic belt member, in order to improve the useful life of the belt member. Where the layers which form the belt member all have the same thickness, an inner layer thereof has a smaller turning radius which results in a larger bending stress and thus more fatigue. Thus, the useful life of the V-belt is decreased.

SUMMARY OF THE INVENTION

It is the primary object of the present invention to provide a V-belt assembly for use in a V-belt transmission in which the V-belt is formed of a plurality of layers such that the bending stress is uniform for each of the layers.

The present invention is directed to a V-belt assembly for use in a V-belt transmission. The V-belt assembly comprises an endless belt having a plurality of endless layers wherein the thickness of each of the layers is less than the thickness of the adjacent outer layer. The V-belt assembly also includes a plurality of V-shaped members, each V-shaped member having a belt engaging surface and a plurality of intermediate members disposed between adjacent V-shaped members wherein the V-shaped members and the intermediate members are fastened or bound together from the outer periphery thereof with the endless belt.

DETAILED DESCRIPTION OF THE PREFERRED EMBODIMENT

Figure 1:
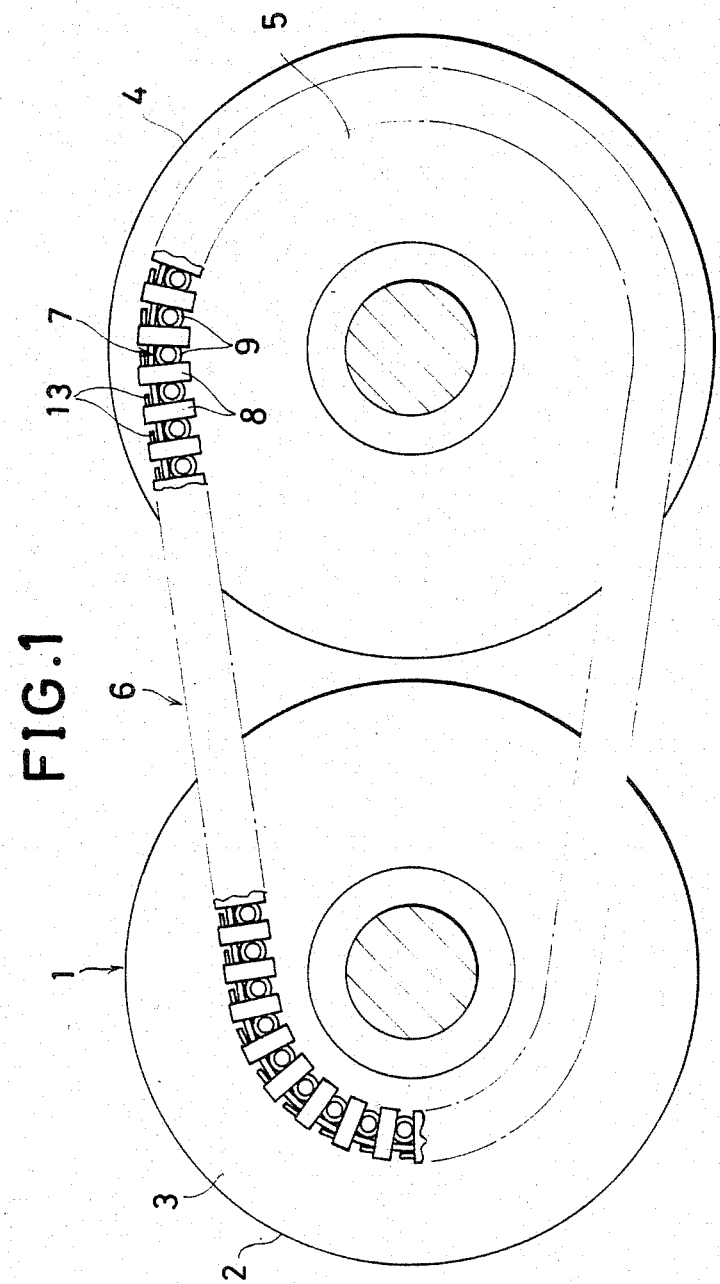
FIG. 1 is a side view, partly in section, of one embodiment of the present invention.

Referring to FIGS. 1 to 4, a variable-speed type power transmission 1 for a motorized two-wheeled vehicle is shown. The transmission has a V-belt assembly 6 operatively positioned between a V-groove 3 of a variable V-pulley 2 on the driving side and a V-groove 5 of a variable V-pulley 4 on the driven side to effect power transmission between the two pulleys 2 and 4.

The V-belt asembly 6 comprises a plurality of V-shaped metallic members 8 and plural resilient intermediate metallic members 9 disposed alternately with each other and in mutual contact along on a metallic belt member 7. The belt member 7 comprises plural endless metallic plates 7a placed one upon another in layers. The resilient intermediate metallic members 9 are hollow rollers and each member 9 is brought into engagement with respective recessed surfaces 10 formed on mutually facing surfaces of a pair of the V-shaped metallic members 8 located on both sides thereof. The members 9 are fastened or bound together from the outer periphery thereof with the metallic belt member 7. The metallic belt member 7 thus, pushes together the respective resilient intermediate metallic members 9 through the respective V-shaped metallic members 8 and thus, these members 7, 8 and 9 are combined together by mutual pushing thereof.

The respective V-shaped metallic members 8 are set in position in relation to the metallic belt member 7, so that when the respective V-shaped metallic members 8 are brought into engagement with the V-groove 3 of the V-pulley 2 on the driving side and are turned therearound, the metallic belt member 7 is tensioned by the driving force. During this operation, the respective V-shaped metallic members 8 are inclined with respect to each other when turned around the respective V-pulleys 2 and 4 and in this case inclination movements thereof can be carried out smoothly through the respective intermediate hollow roller members 9.

Each of the V-shaped metallic members 8 are made of a comparatively thick plate-shaped block and are provided with a channel-shaped guide groove 11 which opens outwards so that the metallic belt member 7 may be inserted through the guide groove 11. Additionally, a stopper member 13 is inserted into and engaged with right and left engaging grooves 12 in upper portions of the inner lateral side walls of the guide groove 11 to prevent belt member 7 from coming out of groove 11.

Additionally, each of the foregoing V-shaped metallic members 8 which are supported between the pair of resilient metallic members 9 on both sides thereof is movable inwards and outwards, and is provided with an engaging surface 14 facing an inner circumferential surface of the metallic belt member 7. Thus, when each of the metallic members 8 are brought into engagement with each of the V-pulleys 2 and 4, the metallic members are pushed by the V-grooves 3 and 5 to move outwards and are brought into presssure contact at the engaging surface 14, with the belt member 7.

Figure 2:
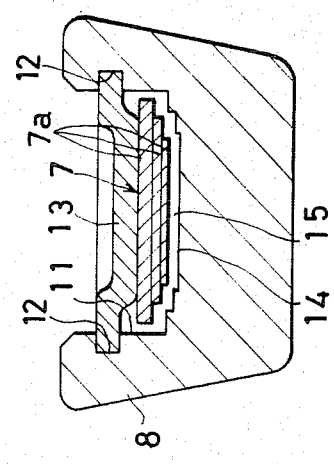
FIG. 2 is an enlarged sectional side view of a portion thereof.

In more detail, each of the V-shaped metallic members 8 are brought into engagement at the recessed surfaces 10 with the respective resilient metallic members 9 as shown in FIG. 2. In this situation, the recessed surfaces 10 extend in the inner and outer directions, that is, the upper and lower directions as seen in FIG. 2, so that the member 8 moves inwards and outwards within this recessed surface range. Thus, when each of the V-shaped metallic members 8 are brought into engagement with the V-groove 3 of the V-pulley 2 as shown in FIG. 2, for example, the metallic member 8 is pushed by both side wall surfaces of the V-groove 3 to move outwards so that it is brought into pressure contact, at the engaging surface 14 thereof, with the metallic belt member 7.

Figure 3:
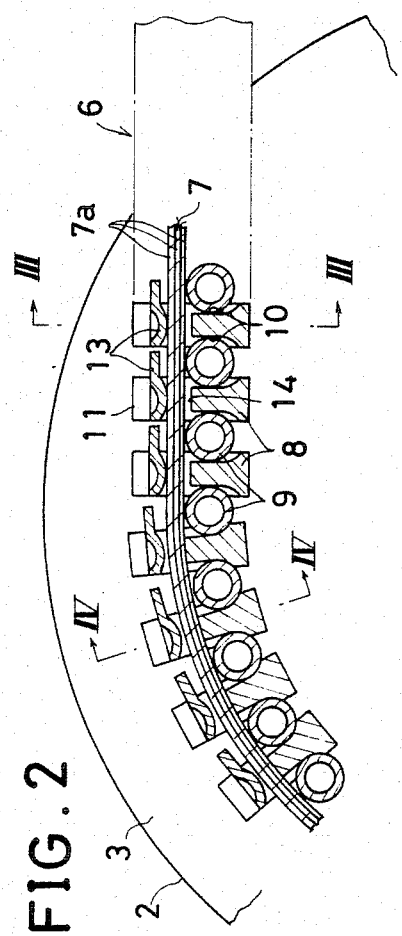
FIGS. 3 and 4 are sectional views taken along the lines III—III and IV—IV in FIG. 2.

The bottom surface of the guide groove 11 serves as the engaging surface 14, and when the respective V-shaped metallic members 8 are not in engagement with the respective V-pulleys 2 and 4, in other words, at a linear portion of the V-belt assembly 6 located between the V-pulleys 2 and 4, there is a gap 15 between the engaging surface 14 of each engaging surface 14 and the belt member 7, as shown in FIG. 3. However, when the respective V-shaped metallic members 8 are brought in engagement with the respective V-pulleys 2 and 4, in other words, at the curved portion of the V-belt assembly 6, the respective V-shaped metallic members 8 are moved to slide outwards (upwards in the drawings) so that the engaging surface 14 and the belt member 7 are brought into pressure contact one with another as shown in FIG. 4.

Figure 4:
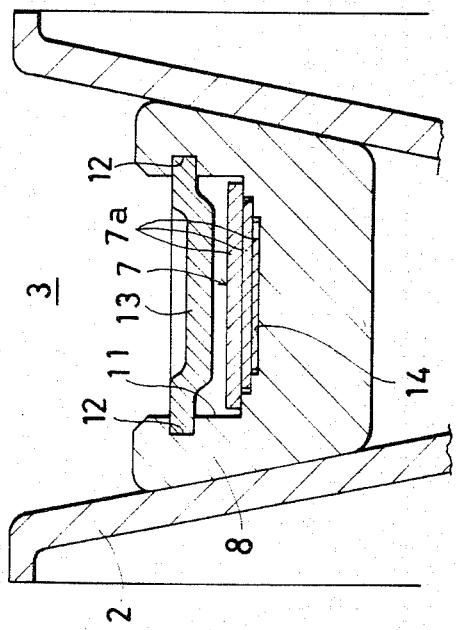

In the foregoing example, as shown in FIGS. 3 and 4, the metallic plates or layers 7a comprising the belt member 7 are gradually decreased in width towards the inside so that the belt member 7 has a stepped V-shaped cross-section. Further, the engaging surface 14 is arranged in a corresponding stepped V-shaped in section. Thus, when each of the V-shaped metallic members 8 are moved outwards when brought into pressure contact with the belt member 7, the respective stepped surfaces of the engaging surface 14 are brought into pressure contact with the respective corresponding plates 7a of the belt member 7 resulting in a better connection between the two members 7, 8.

Figure 5:
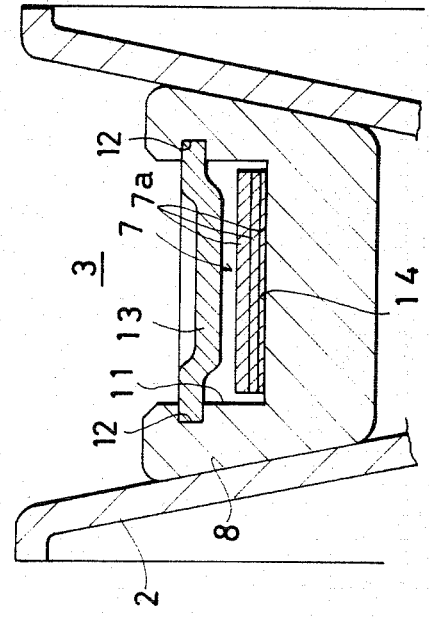
FIG. 5 is a sectional view of an alternate embodiment of the present invention.

An alternate embodiment of the present invention is shown in FIG. 5. The plates 7a are equal in width but differ in thickness and the engaging surface 14 is a flat plane. Thus, only the innermost layer metallic plate 7a of the belt member 7 is brought into pressure contact with the metallic member 8.

The respective metallic plates 7a of the belt member 7 are such that any inner layer thereof has a larger bending moment than an outer layer thereof when they are bent at each of the V-pulleys 2 and 4. According to this invention, these metallic plates 7a are decreased in thickness towards the inside, so that the metallic plates 7a are substantially uniform in maximum bending stress and consequently, the belt member 7 has an improved life of use.

The maximum bending stress $\sigma$ max is expressed by the following formula:

$$\sigma_{max} = M/I \times t/2.$$

Where: M is the bending moment; I is the second moment of area; and t is the thickness thereof.

Thus, if the inner layer metallic plate 7a is decreased in thickness by the increasing amount of the bending moment M, there is no difference in the maximum bending stress between an inner layer and an outer layer, thereby preventing the inner layer metallic plate 7a from becoming fatigued before an outer metallic plate 7a by repeated bending actions.

Thus, according to the present invention, the metallic plates comprising the metallic belt member are decreased in thickness towards the inside, so that the stresses applied to the belt member at the time of bending thereof at the V-pulley can be uniformly distributed, and the life of the belt member can be extended.

The present invention may be embodied in other specific forms without departing from the spirit or essential characteristics thereof. The presently disclosed embodiments are, therefore, to be considered in all respects as illustrative and restrictive, the scope of the invention being indicated by the appended claims, rather than the foregoing description, and all changes which come within the meaning and range of equivalency of the claims are, therefore, to be embraced therein.

What is claimed is:

1. A V-belt assembly for use in a V-belt transmission, said V-belt assembly comprising:
    (a) endless belt means having a plurality of endless layers, wherein the thickness of each said layer is less than the thickness of the adjacent outer layer;
    (b) a plurality of V-shaped members, each V-shaped member having a belt engaging surface; and
    (c) intermediate members disposed between adjacent V-shaped members.

2. A V-belt assembly as set forth in claim 1, wherein said intermediate members are maintained in mutually engaged relation between respective recessed surfaces formed on mutually facing surfaces of adjacent pairs of said V-shaped members and said endless belt means, such that said V-shaped members and said intermediate members are fastened together from outer peripheries thereof with said endless belt means.

3. A V-belt assembly as set forth in claim 1, wherein said intermediate members are resilient.

4. A V-belt assembly as set forth in claim 1 wherein said V-shaped members contact said intermediate members such that said V-shaped members are movable towards and away from said endless belt means.

5. A V-belt assembly as set forth in claim 1, wherein the width of each of said layers is less than the width of the adjacent outer layer.

6. A V-belt assembly as set forth in claim 1, wherein the width of each of said layers is the same.

* * * * *